United States Patent [19]

Canzano et al.

[11] Patent Number: 4,874,011

[45] Date of Patent: Oct. 17, 1989

[54] GAS PRESSURE REGULATOR FOR CONTROLLING LOW PRESSURE

[76] Inventors: Pasquale S. Canzano, 31 Candlewicke Dr., Dover, Del. 19901; Brock J. Vinton, 501 Greenbank Rd., Wilmington, Del. 19804

[21] Appl. No.: 296,223

[22] Filed: Jan. 12, 1989

[51] Int. Cl.⁴ .............................................. G05D 16/10
[52] U.S. Cl. ........................... 137/505.13; 137/505.18
[58] Field of Search ....................... 137/505.18, 505.26, 137/505.28, 505.13, 505.15

[56] References Cited

U.S. PATENT DOCUMENTS

| | | |
|---|---|---|
| 2,660,834 | 12/1953 | MacGlashan . |
| 3,269,598 | 8/1966 | Butters et al. . |
| 3,374,803 | 3/1968 | Leveque . |
| 3,495,607 | 2/1970 | Shugarman ............... 137/505.28 X |
| 3,561,649 | 2/1971 | Wilson . |
| 3,567,289 | 3/1971 | Kawabe ..................... 137/505.15 X |
| 3,948,419 | 4/1976 | Polster . |
| 3,968,814 | 7/1976 | Swanson et al. ............... 137/505.18 |
| 4,276,902 | 7/1981 | Roth . |
| 4,484,598 | 11/1984 | Reiffert et al. ............. 137/505.18 X |

FOREIGN PATENT DOCUMENTS 2307305  11/1976  France ............................ 137/505.18

*Primary Examiner*—Stephen M. Hepperle
*Attorney, Agent, or Firm*—John C. Andrade

[57] ABSTRACT

A gas pressure regulator useful in controlling low pressures in the range of 0 to 100 psig is economical, effective and efficient and can be used to control fixed or variable outlet pressures.

14 Claims, 2 Drawing Sheets

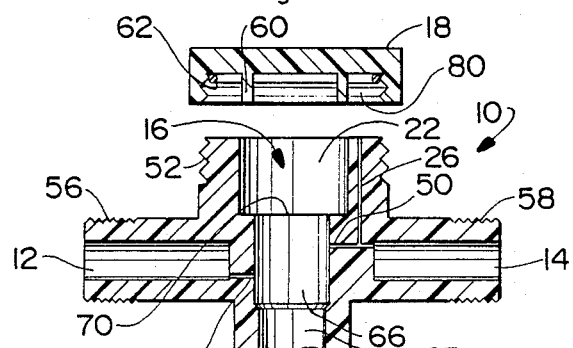
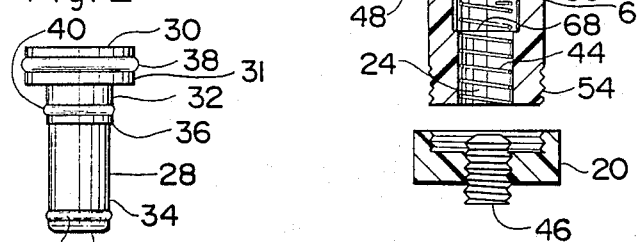
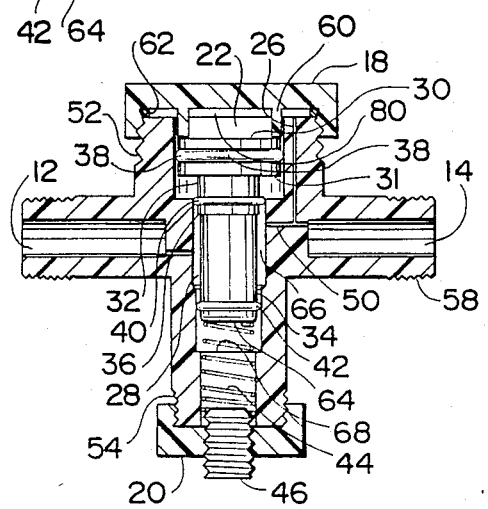
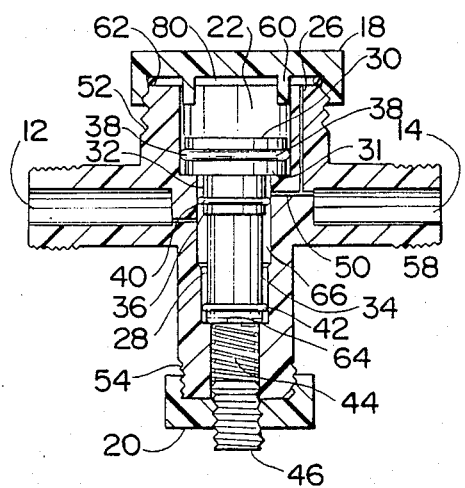

GAS PRESSURE REGULATOR FOR CONTROLLING LOW PRESSURE

BACKGROUND

This invention relates to a simple regulator for controlling pressures at extremely low pressures. More particularly it relates to a low pressure regulator that regulates pressure by use of a recycle bore on the outlet side. The recycle bore allows the outlet pressure to exert a force on a plunger top having a larger surface area, while the inlet pressure exerts a force on a significantly smaller surface area of the plunger.

U.S. Pat. No. 4,276,902 discloses a rigid plastic valve housing having opposed inlet port and outlet port and a hollow cylindrical interior having four stepped concentric cylindrical bores. The sealing means are O-rings and the first actuating means is on the solid flat piston head and the second actuating means is a compression loaded metal spring.

U.S. Pat. No. 3,374,803 discloses a valve which maintains a set pressure for operating a device and is actuated by at least one spring and U.S. Pat. No. 3,269,598 discloses a pressure regulator for use in supplying gas pressure to a dispenser for a liquid. The valve is spring activated and is normally in the open position.

U.S. Pat. No. 2,660,834 discloses a pressure regulator where the inlet port is below the outlet port and the sealing means is positioned in between the inlet port and the outlet port in the closed position.

The above disclosed references incorporate springs and do so principally in order to actuate the piston to counteract the effect of the pressure from the inlet port. This invention does not require a spring for operation of the valve.

It would be desirable to have a simple pressure regulator for controlling pressures at extremely low pressures. High pressure is defined for purposes of this specification to be greater that 100 psig and low pressures are defined as those below 100 psig and extremely low pressures defined those between 0 and 10 psig. While the need for a pressure regulator to control pressures below 100 psig is desirable, there is an especially significant need to control pressures between 0 and 10 psig.

Carbon dioxide and nitrogen are used as propellants to dispense food beverages. Generally the food beverage is dispensed from commercial containers using these gases in pressures of 10 to 40 psig. Pressures below 10 psig are desirable to minimize foaming of the product, as in the case of beer. A low pressure inline regulator would eliminate the need for calculating and using excess dispensing hoses, tubing or piping to accomplish the required pressure drop to obtain extremely low dispensing pressures below 10 psig.

Certain common and widely used laboratory test methods use inert gases to purge or blanket test apparatus for safety purposes and to assure noncontamination of materials tested. Gases such as nitrogen and argon are generally used for such purposes. Extremely low gas pressure of less than 10 psig are preferred in such an apparatus, because the apparatus is generally glass and the possibility of breakage is minimized. Low pressure gas control is currently accomplished in such an apparatus by using an external pinch valve on flexible tubing or hosing or an insertion of a physical restriction in the gas supply line. Both the above controls are potentially dangerous to the apparatus in the event that either the pinched valve or other restriction works loose and sufficiently high pressures develop. This can result in the breakage of apparatus and loss of test results and possible injury to personnel.

SUMMARY OF THE INVENTION

A novel economical gas pressure regulator for controlling low pressures has now been discovered. The low pressure regulator of this invention comprises:

(a) a rigid housing having inlet and outlet ports, the inlet port being located below said outlet port, a hollow interior having at least two bores, the upper bore disposed above and having a larger inner diameter than the lower bore and the lower bore being below the inlet port, and the inlet and outlet ports being in communication with the hollow interior, a top sealing means preferably a top cap sealing the top of the hollow interior and a means for directing pressure at the outlet port to the top of a plunger described below actuating the plunger in moving it from an open to a closed position, the means for directing pressure, preferable being a recycle bore connecting the outlet port with the hollow interior in close proximity to the top cap;

(b) a plunger, having a top and a bottom, slidably mounted in the hollow interior of the housing and having a lip and an upper portion disposed directly above a lower portion, said upper portion having a larger cross sectional surface area than the lower portion and the excess surface area of the upper portion forming the lip at the interface of the upper portion and the lower portion, said lip having a smaller surface area than the top of said plunger, said plunger having at least one, preferably at least two, sealing means, an upper sealing means and a middle sealing means being below said upper sealing means, both sealing means being in the upper portion of the plunger;

(c) the plunger being movable between a closed position, where the middle sealing means is positioned above the inlet port and below the outlet port and preferably an upper sealing means is positioned above the outlet port; and an open position, where the middle sealing means and the upper sealing means are both positioned above the outlet port;

(d) A lower sealing means being below said middle sealing means and below said inlet port.

The regulator hollow interior preferably comprises at least four concentric cylindrical bores, the upper bore having a top and upper middle concentric cylindrical bore, said top cylindrical bore being disposed above and having a larger inner diameter than said upper middle cylindrical bore disposed above said lower bore having a lower middle and bottom concentric cylindrical bore, said lower middle cylindrical bore being disposed above and having a larger inner diameter than said bottom cylindrical bore and the plunger should be preferably cylindrical in shape having a plurality of concentric cylinders and a top and bottom and the upper, middle and lower sealing means are preferably O-rings. The diameter of the bottom concentric cylinder bore should be smaller than the diameter of the plunger bottom which is one means for preventing the plunger from moving downward to where the middle sealing means would be below the inlet port. The top and the bottom of the hollow exterior of the housing are preferably screw caps. The bottom cap preferably has a hole in the middle for an adjustable screw and a spring which would be in communication with and located between the bottom of the plunger and the adjustable screw within the hollow interior of the housing.

The subject invention is effective, efficient and economical for low pressure gas control. The preferred plunger is equipped with three O rings which isolate the inlet and outlet ports of the regulator during operation and achieve the required pressure control on the outlet side of the regulator. The inlet pressure may be from 0 to 100 psig. The outlet pressure is controlled by the diameter of the inlet and outlet orifices in the regulator and the surface areas of the top of the plunger and the lip of the plunger. Therefore, a spring is not required for operation of the valve. A simple version without a spring allows for nonvariable control of a fixed outlet pressure. The valve is normally opened at atmospheric pressure (0 psig) and can control outlet pressures in the extremely low range of 0 to 10 psig. The addition of a spring allows variable outlet pressure control. The compression of the spring can be increased or decreased by means of the adjustable screw in the base of the regulator and can be used to vary control of the outlet pressure from outside of the regulator bottom cap. The preferred form of the regulator is designed so that screw caps on the inlet and outlet of the plunger cavity may be easily removed. This allows for simple maintenance and diverse use of the regulator. For example, the control characteristics may be changed to suit new operating conditions by replacing the spring with another spring having a different spring constant. Maintenance is extremely simple in that the O-rings can be easily lubricated and replaced if necessary. The regulator can be placed in line for tubing sizes as small as $\frac{1}{8}$ inch OD up to $\frac{1}{4}$ inch standard pipe, although its use in larger diameter piping systems is not precluded. All the parts can be molded from inert plastics or machined to specific requirements.

BRIEF DESCRIPTION OF THE DRAWINGS

FIG. 1 is a perspective view of the housing of the regulator.

FIG. 2 is a perspective view of the plunger of the regulator.

FIG. 3 is a perspective view of the regulator with the plunger in the open position.

FIG. 4 is a perspective view of the regulator with the plunger in the closed position.

DETAILED DESCRIPTION OF THE DRAWINGS

Figure 5:
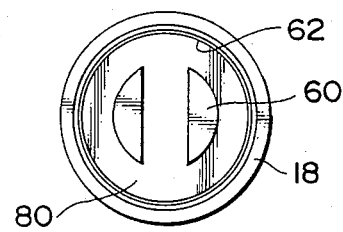
FIG. 5 is a perspective view of the top cap of the regulator.

Referring to FIG. 1, the housing 10 of the regulator is shown with four concentric bores, a top bore 22, a smaller upper middle bore 66, a smaller lower middle bore 65 after "66", and a still smaller bottom bore 24. The housing as shown has an outer inlet port 12 and an outer outlet port 14 and the outer inlet port 12 has external screw threads 56 and the outer outlet port 14 has external screw threads 58. The outer inlet port 12 is in communication with the inner inlet port 48 which is in communication with the interior 16 of the housing and the outer outlet port 14 is in communication with the inner outlet port 50 which is in communication with the interior 16 of the housing 10. As shown in FIG. 1, the inner inlet port 48 is in communication with the interior 16 of the housing 10 at a lower point than the inner outlet port 50. The housing in FIG. 1 is shown with inner 48 and outer 12 inlet ports and inner 50 and outer 14 outlet ports. The inlet and outlet ports can be of two different sizes as shown, of one size or of a multiple of sizes. In addition there is no requirement that both the inlet and outlet ports be of similar configurations. The inlet and outlet sizes will depend on the applications for the regulator and the pressures to be regulated. The top of the housing as shown consists of a cap 18, the configuration of which is shown in more detail in FIG. 5. The cap 18 as shown has studs 60 and an O-ring 62 and is screwed to the external screw threads 52. The bottom cap 20 shown is attached to the housing by being screwed to the external screw threads 54. The bottom cap 20 shown further has an adjustable screw 46 which when screwed into the cap tightens the compression on the spring 44 and when screwed out of the cap reduces the compression on the spring 44. The recycle bore 26 connects the inner outlet bore 50 with the space 80 in the top cap 18. The meeting of the top concentric bore 22 with the upper middle concentric bore 66 creates a ledge 70. The width of the ledge 70 is the difference in the radius between upper concentric bore 22 and upper middle concentric bore 66. Likewise, the meeting of lower middle concentric bore 65 and bottom concentric bore 24 creates ledge 68 and the width of ledge 68 is the difference in radius between middle concentric bore 65 and bottom concentric bore 24.

Referring to FIG. 2, the plunger 28 of the regulator of this invention is shown. The plunger 28 shown has three concentric cylinders, shown in decreasing diameter from the upper concentric cylinder 31 to the middle concentric cylinder 32 to the lower concentric cylinder 34. Each of the three cylinders is shown with an O-ring. The upper concentric cylinder O-ring 38, middle concentric cylinder O-ring 40 and the lower concentric cylinder O-ring 42 act as effective sealing means when used in conjunction with the housing shown in FIG. 1. The meeting of middle concentric cylinder 32 and lower concentric cylinder 34 forms a lip 36. The width of the lip 36 is the difference in radius of the middle concentric cylinder 32 and the lower concentric cylinder 34 and the surface area of the lip is obtained by the following equation: Surface Area of the Lip $= \pi(w^2 + wd_{34})$, where: $w$ = width of the lip and $d_{34}$ = the diameter of lower concentric cylinder 34. The top 30 of the plunger has significantly larger surface area than the lip 36. Also shown is the bottom of the plunger 64 upon which the spring 44 from FIG. 1 may act.

Referring to FIGS. 3 and 4, the plunger is shown seated within the housing and the bottom and top cap are shown in the screwed on position. As shown in FIG. 3, the O-ring 40 is above both the inner inlet port 48 and the inner outlet port 50. This allows any higher pressure gas to enter through outer inlet port 12 to inner inlet port 48, through the space created by the difference in diameter between middle concentric bore 66 and lower concentric cylinder 34 and the higher pressure gas exits through inner outlet bore 50 and both recycles through recycle bore 26 and increases the pressure at the outer outlet bore 14. The higher pressure gas enters space 80 in the top cap through the recycle bore 26 and exerts pressure on the relatively large surface area of the top 30 of the plunger 28. The effect is to exert a force upon the plunger top surface 30 pushing the plunger down to the position shown in FIG. 4. The plunger as shown in FIG. 4 is in the closed position because the middle O-ring 40 seals the space in the middle concentric bore between the inner inlet port 48 and the inner outlet port 50. The higher pressure gas coming into inlet port 12 is then trapped between middle O-ring 40 and lower O-ring 42 and cannot now exit through the regulator. As the pressure at the outer outlet port 14 and inner outlet port 50 is decreased, the force on the top 30 of the plunger also decreases. The higher pressure gas in the regulator acting upon lip 36 raises the lunger to the position shown in FIG. 3. When the plunger is in the position shown in FIG. 3, the higher pressure gas enters recycle bore 26 and acts upon the top 30 of the plunger, exerting a downward force while the inlet gas is exerting an upward force on the lip 36. While the gas exerting an upward force on the lip 36 will be of a higher pressure then the gas exerting a downward force on the plunger 30, the gas exerting the downward force is operating on a much larger surface area than the gas exerting the upward force and the plunger 28 will move from the position shown in FIG. 3 to the position shown in FIG. 4. The moving of the plunger between the positions shown on FIG. 3 and 4 will act to regulate the pressure of the gas coming into inlet port 12. The plunger bottom 64 as shown in FIG. 4 rests upon the ledge 68 which prevents the plunger from dropping further. The spring 44 shown in FIG. 3 and 4 exerts an upward force on the plunger bottom 64, which acts to decrease the pressure necessary to be exerted on lip 36 in order to move the plunger from the closed position shown in FIG. 4 to the opened position shown in FIG. 3 and provides a higher level of control of the outlet pressure. Different compressions of spring can be used and the screw 46 can be used to vary the compression of the spring 44 and thus vary the upward force exerted on the plunger 28 and correspondingly vary the resistance to closure which the downward force acting on the top 30 of the plunge must counteract. While the spring is not necessary for the regulator to operate, incorporation of a spring is helpful because, in addition to providing a higher level of control, it provides an easy method for adjusting the outlet pressure. The lower O-ring 42 acts as a sealing means preventing the inlet gas from acting on the plunger bottom 64.

Referring to FIG. 5, the top cap 18 is shown in more detail. The studs 60, shown in FIG. 5, are crescent shaped and act to prevent the plunger 28 shown in FIG. 3 and 4 from rising further. This allows the gas from the recycle bore 26 to enter the space 80 in the cap 18 and act upon the plunger top 30. Other configurations of the cap that allow the gas to pass from the recycle bore 26 into the space of the cap 80 and thus act on the plunger top 30 would be workable.

Figure 6:
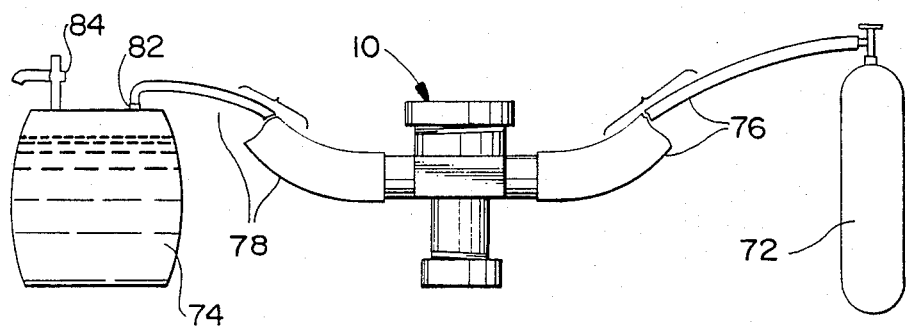
FIG. 6 is a schematic drawing of the regulator in use with a beer keg.

Referring to FIG. 6, a schematic of the regulator of this invention is shown in use with a beer keg 74. The higher pressure gas, $CO_2$ 72 would pass through line 76 and into outer inlet port 12 as shown in FIG. 3 of the regulator 10. The gas would exit through outer outlet 14 as shown in FIG. 3 and would pass into line 78 which would feed the $CO_2$ directly into the keg 74 through an appropriate fitting 82. The regulator would act to reduce and regulate the pressure of the $CO_2$ entering the beer keg 74 and assure uniform and smooth serving of the beer from the tap 84.

As the pressure in the beer keg 74 drops as beer is drawn from the tap the back pressure at the regulator outlet and thus the pressure on the plunger top in the regulator would drop, causing the plunger to move to the position shown in FIG. 3. The $CO_2$ would then pass through line 76 through the inlet and as the $CO_2$ passes into the outlet it would increase the pressure in the beer keg. The pressure in the keg would increase and the back pressure at the regulator outlet would increase and the $CO_2$ would be forced through the recycle bore 26 and exert a force on the plunger top 30, as shown in FIG. 3. When sufficient force is exerted on the plunger top 30 it would move the plunger to the position shown in FIG. 4 and the cycle would repeat itself and thus regulate the pressure in the beer keg.

We claim:

1. A pressure regulator comprising:
   (a) a rigid housing having inlet and outlet ports said inlet port being below said outlet port, a hollow interior, having at least two bores, the upper bore disposed above and having a larger inner diameter than the lower bore and the lower bore being below the inlet port, said inlet and outlet ports being in communication with said hollow interior, a top cap sealing the top of the hollow interior and a recycle bore connecting said outlet port with said hollow interior in close proximity to the top cap;
   (b) A plunger slidably mounted in the hollow interior of the housing and having a lip and an upper portion disposed directly above a lower portion, said upper portion having a larger cross sectional area than the lower portion and the excess surface area of said upper portion forming said lip at the interface of said upper portion and said lower portion, said plunger having at least two sealing means, an upper sealing means and a middle sealing means being below said upper sealing means, both sealing means being in said upper portion of the plunger;
   (c) The plunger being movable between a closed position, said middle sealing means being above said inlet port and below said outlet port and said upper sealing means being above said outlet port; and an open position, said middle sealing means and said upper sealing means being above the outlet port;
   (d) A lower sealing means being below said middle sealing means and below said inlet port.

2. The regulator of claim 1 further comprising means for preventing said plunger from moving downward to where said middle sealing means would be below said inlet port.

3. The regulator of claim 2 wherein the lower sealing means is located in the lower portion of the plunger.

4. The regulator of claim 3 wherein the interior of the housing and the plunger are cylindrical in shape.

5. The regulator of claim 4 wherein the upper portion of the plunger comprises an upper concentric cylinder disposed above a middle concentric cylinder.

6. The regulator of claim 5 wherein the upper, middle and lower sealing means are O-rings.

7. The regulator of claim 6 wherein the bottom of the hollow interior is covered by a bottom cap.

8. The regulator of claim 7 further comprising a spring, being within the hollow interior of the housing, below the bottom of the plunger, the top of said spring being in communication with the bottom of the said plunger and the bottom of said spring being in communication with the inside of the bottom cap.

9. The regulator of claim 8 further comprising an adjustable screw in communication with the bottom of said spring and passing through said bottom cap, and being adjustable from outside of said bottom cap.

10. The regulator of claim 9 wherein both the top and the bottom cap are screw connected at the top and bottom respectively of said housing.

11. The regulator of claim 6 wherein said hollow interior comprises at least four concentric cylindrical bores, said upper bore having a top and upper middle concentric cylindrical bore, said top cylindrical bore being disposed above and having a larger inner diameter than said upper middle cylindrical bore disposed above said lower bore having a lower middle and bottom concentric cylindrical bore, said lower middle cylindrical bore being disposed above and having a larger inner diameter than said bottom cylindrical bore and wherein the diameter of said bottom concentric cylindrical bore is smaller than the diameter of the bottom of the plunger.

12. A pressure regulator comprising:
  (a) a rigid housing having inlet and outlet ports said inlet port being below said outlet port and a hollow interior having at least two concentric bores, the upper bore disposed above and having a larger inner diameter than the lower bore and the lower concentric bore being below the inlet port,
  (b) a plunger having at least one sealing means and having a top, a lip and an upper portion of the plunger having a larger cross-sectional area than a lower portion of said plunger, disposed directly below said upper portion, the excess surface area of said upper portion forming a lip at the interface of said upper and said lower portion, and said lip being below said sealing means slidably mounted in said hollow interior of said housing
  (c) said plunger being movable between a closed position, said plunger sealing means being above said inlet port and below said outlet port, and an open position, said plunger sealing mans being above said outlet port;
  (d) a top sealing means above said hollow interior;
  (e) a lower sealing means being below said plunger sealing means and below said inlet port; and
  (f) a means for directing pressure at said outlet port to the top of said plunger actuating said plunger in moving it from said open to said closed position.

13. The pressure regulator of claim 12 wherein the surface area of the plunger top is substantially larger than the surface area of the plunger lip.

14. The pressure regulator of claim 13 further comprising means for preventing said plunger from moving downward to where said middle sealing means would be below said inlet port.

* * * * *